(12) United States Patent 
Katou

(10) Patent No.: US 7,596,374 B2
(45) Date of Patent: Sep. 29, 2009

(54) DATA BACKUP SYSTEM AND METHOD FOR MOBILE COMMUNICATION TERMINAL, MOBILE COMMUNICATION TERMINAL AND BACKUP DEVICE USED FOR SAME, AND BACKUP DATA TRANSMISSION METHOD

(75) Inventor: Hidenori Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/266,563

(22) Filed: Nov. 3, 2005

(65) Prior Publication Data

US 2006/0094419 A1 May 4, 2006

(30) Foreign Application Priority Data

Nov. 4, 2004 (JP) ............................. 2004-320406

(51) Int. Cl.
*H04W 24/00* (2009.01)
*H04M 1/00* (2006.01)
*G06F 13/28* (2006.01)
*G06F 17/30* (2006.01)

(52) U.S. Cl. ................. 455/425; 455/550.1; 455/556.2; 711/162; 707/204

(58) Field of Classification Search ............... 455/414.1, 455/414.2, 414.3, 414.4, 418–420, 410–411, 455/466, 423–425, 72, 422.1, 514, 517, 550.1, 455/556.2, 557–558; 711/162, 164, 171; 707/202–204

See application file for complete search history.

(56) References Cited

U.S. PATENT DOCUMENTS

| | | | |
|---|---|---|---|
| 5,758,359 A | * | 5/1998 | Saxon ........................ 707/204 |
| 6,064,880 A | | 5/2000 | Alanara |
| 6,874,031 B2 | * | 3/2005 | Corbeil ........................ 709/229 |
| 6,963,908 B1 | * | 11/2005 | Lynch et al. ................. 709/220 |
| 7,287,047 B2 | * | 10/2007 | Kavuri ........................ 707/204 |
| 7,401,194 B2 | * | 7/2008 | Jewell ........................ 711/162 |
| 2002/0160760 A1 | * | 10/2002 | Aoyama ..................... 455/414 |
| 2003/0134625 A1 | * | 7/2003 | Choi ........................... 455/418 |
| 2003/0166399 A1 | * | 9/2003 | Tokkonen et al. ........... 455/419 |
| 2003/0204690 A1 | * | 10/2003 | Yamada et al. .............. 711/162 |
| 2004/0005873 A1 | * | 1/2004 | Groenendaal et al. ....... 455/410 |
| 2005/0191998 A1 | * | 9/2005 | Onyon et al. ................ 455/419 |
| 2006/0171523 A1 | * | 8/2006 | Greenwell ............... 455/414.1 |

FOREIGN PATENT DOCUMENTS

| | | |
|---|---|---|
| CN | 1490983 A | 4/2004 |
| WO | WO 03/037015 A1 | 5/2003 |
| WO | WO 2005/026958 | 3/2005 |

* cited by examiner

*Primary Examiner*—Meless N Zewdu
(74) *Attorney, Agent, or Firm*—Scully, Scott, Murphy & Presser, P.C.

(57) ABSTRACT

A data backup system and a data backup method for backing up data stored in a mobile communication terminal to a backup device via a communication network, capable of optimizing network traffic as well as improving the selectivity of backup data to thereby improve convenience for the user, a mobile communication terminal and a backup device used for the same, and a backup data transmission method. When transmitting user data from a mobile communication terminal as backup data, the user arbitrary selects at least one of a plurality of data selection condition candidates to set the selected one as a data selection condition. Based on the one or more data selection conditions, user data to be backed up are selected from all user data.

20 Claims, 14 Drawing Sheets

FIG. 2
(a)
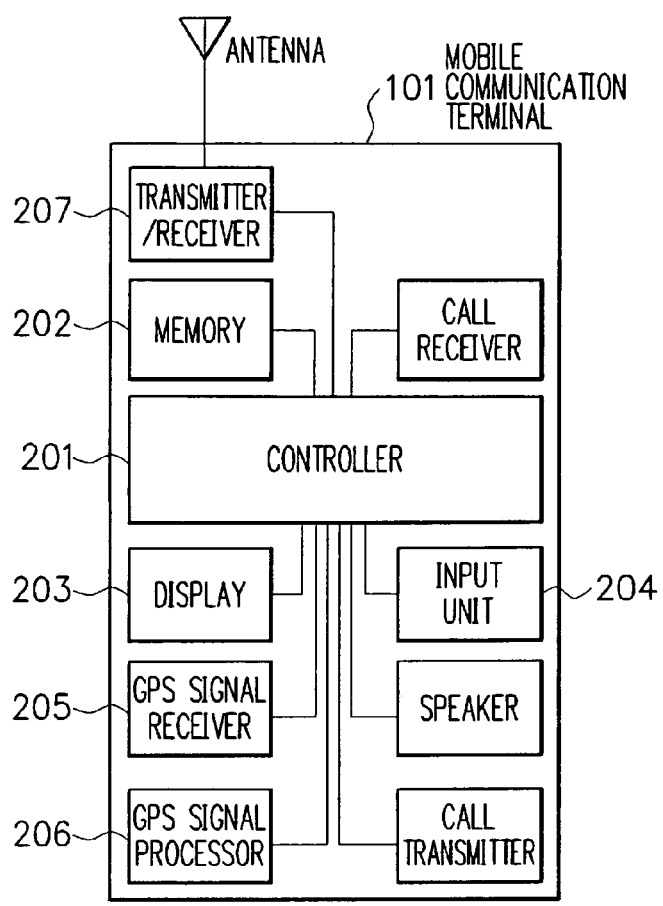
(b)
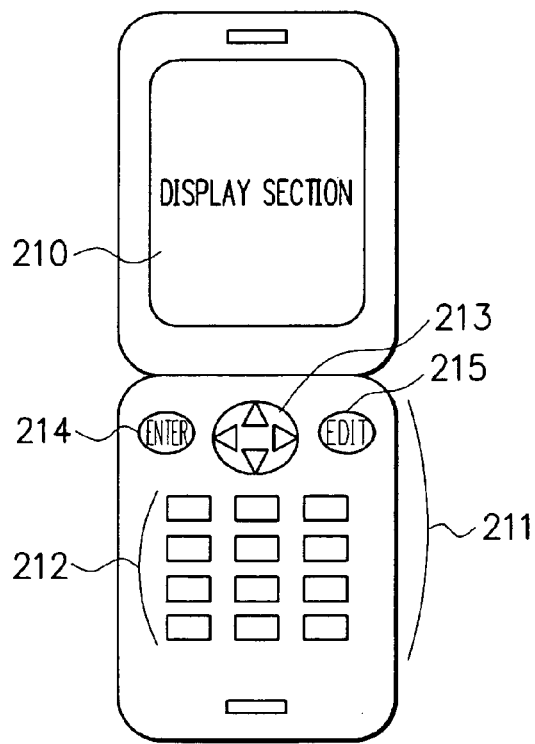

FIG. 5
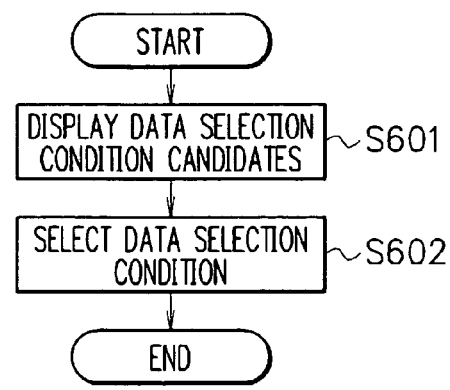
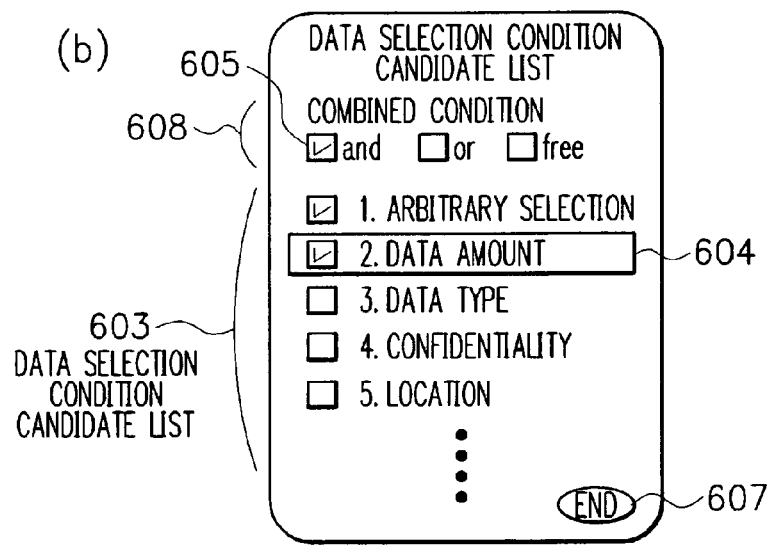
FIG. 6
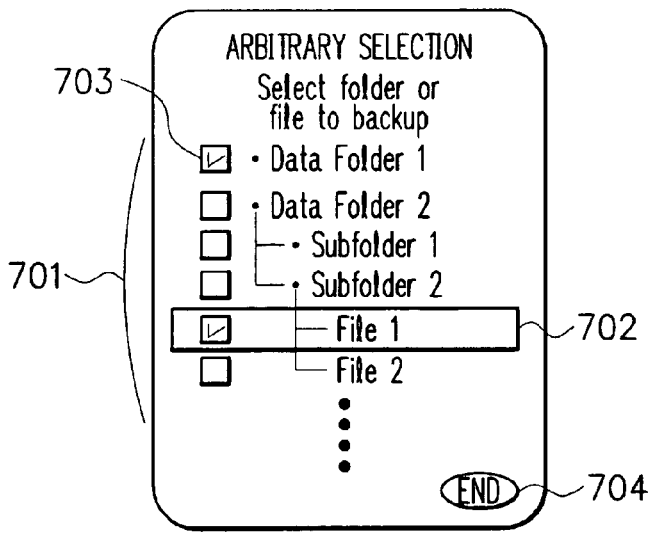

FIG. 7

DATA AMOUNT

Select data amount of file

☐ Moving Image Size (5MB) or Less
☑ Still Image Size (1MB) or Less
☐ Text Size (10KB) or Less
⋮
☐ Arbitrary Setting

END

FIG. 8

DATA TYPE

Select data type of file

☐ Moving Image
☐ Still Image
☐ Text Message
☑ Telephone Directory
☑ E-mail
⋮
☐ Arbitrary Setting END

CONFIDENTIALITY
Select confidentiality
level of file

☐ Level 3 or Less
☑ Level 2 or Less
☐ Level 1

END (b)

CONFIDENTIALITY
LEVEL INFORMATION

Level 3
Electronic Money Information,
Customer Information,...

Level 2
Telephone Directory, Address Book,
Schedule, Image,...

Level 1
Site URL, Public Information,
Memo,...

END

LOCATION
Select Location
- ☑ Home
- ☐ Office
- ☑ Wireless LAN Area
- ☐ A Store
- ☐ B Region
- ☐ C Station Underground Mall
  ⋮

END (b)

LOCATION CONDITION
Location : Wireless LAN Area
Place / Region : ○○○○○
TRANSMISSION
  ☑ YES   ☐ NO
COMBINED CONDITION
  ☐ and  ☑ or  ☐ free

- ☑ 1. ARBITRARY SELECTION
- ☑ 2. DATA AMOUNT
- ☐ 3. DATA TYPE
  ⋮

END

1105

F I G. 11
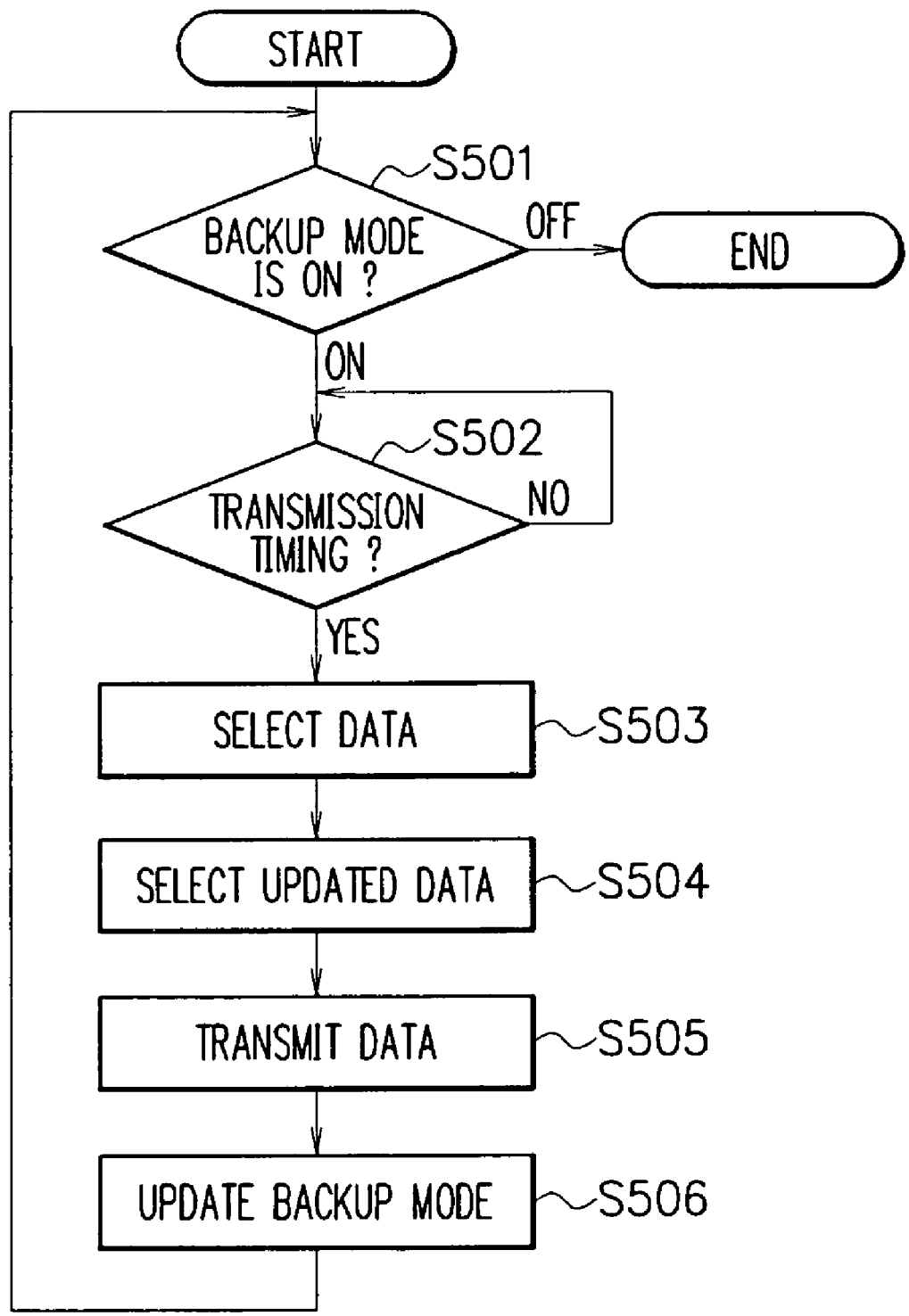

DATA BACKUP SYSTEM AND METHOD FOR MOBILE COMMUNICATION TERMINAL, MOBILE COMMUNICATION TERMINAL AND BACKUP DEVICE USED FOR SAME, AND BACKUP DATA TRANSMISSION METHOD

FIELD OF THE INVENTION

The present invention relates to a system and a method for selectively backing up data stored in a mobile communication terminal via a communication network, a mobile communication terminal and a backup device used for the same, and a backup data transmission method.

BACKGROUND OF THE INVENTION

In recent years, the multifunctionalization of mobile communication terminals has been progressing rapidly. Consequently, a mobile communication terminal is provided with an integration of functions implemented by electronic apparatuses such as a personal computer, a digital video and digital camera. With this multifunctionalization, the types of user data that the user stores in his/her mobile communication terminal have become widely varied. In addition, the maximum amount of each user data tends to grow. Besides, there are increasing opportunities to handle highly confidential data, as for example in the case where electronic money or cash function is used, with the mobile communication terminal.

As such, since the mobile communication terminal comes to store various types of/large amounts of user data, if the data are lost due to the damage, loss, etc. of the terminal, the trouble for the user is even more serious. In order to solve the problem, there have been proposed systems for backing up user data stored in the mobile communication terminal. For example, Japanese Patent Application laid open No. 2004-112478 discloses a data backup system for automatically and regularly backing up user data stored in a mobile communication terminal to a server or the like via a communication network. The data backup system automatically backs up user data, and eliminates the user's need to back up the data via a dedicated cable, etc., thus improving convenience for the user. Moreover, because regular backups of user data are performed, almost the latest information can always be backed up, which further improves convenience for the user.

The conventional backup system, however, transmits all user data to back up. In other words, data that do not need backup are also transmitted each and every time. Therefore, network traffic and transmission time required of the backup substantially increase. As a result, the mobile communication terminal cannot be used for another purpose during the transmission of backup data, and convenience to the user is reduced. Additionally, the inefficient use of radio bands causes lack of lines in the entire system. Further, various usage modes of the mobile communication terminal are not properly supported, and, for example, highly confidential data is at risk of eavesdropping.

SUMMARY OF THE INVENTION

It is therefore an object of the present invention to provide, in consideration of usage conditions of a mobile communication terminal, a data backup system and a data backup method for a mobile communication terminal capable of optimizing network traffic to back up user data stored in a mobile communication terminal and also improving the user selectivity of backup data, a mobile communication terminal and a backup device used for the same, and a backup data transmission method.

In accordance with the first aspect of the present invention, to achieve the object mentioned above, there is provided a mobile communication terminal comprising a data selection condition setting section for arbitrarily selecting at least one of a plurality of data selection condition candidates to set the selected one as a data selection condition, a data selecting section for selecting user data from those stored in the mobile communication terminal according to the data selection condition(s) set by the data selection condition setting section, and a backup data transmitting section for transmitting the user data selected by the data selecting section as backup data.

In accordance with the second aspect of the present invention, there is provided a mobile communication terminal comprising a data selecting section for selecting user data from those stored in the mobile communication terminal according to a plurality of data selection conditions, and a backup data transmitting section for transmitting the user data selected by the data selecting section as backup data.

In accordance with the third aspect of the present invention, there is provided a mobile communication terminal comprising a data selecting section for selecting user data from those stored in the mobile communication terminal according to a data selection condition based on the amount of each user data, and a backup data transmitting section for transmitting the user data selected by the data selecting section as backup data.

In accordance with the fourth aspect of the present invention, there is provided a mobile communication terminal comprising a data selecting section for selecting user data from those stored in the mobile communication terminal according to a data selection condition based on the confidentiality of each user data, and a backup data transmitting section for transmitting the user data selected by the data selecting section as backup data.

In accordance with the fifth aspect of the present invention, there is provided a mobile communication terminal comprising a data selecting section for selecting user data from those stored in the mobile communication terminal according to a data selection condition based on the location of the mobile communication terminal, and a backup data transmitting section for transmitting the user data selected by the data selecting section as backup data.

In accordance with the sixth aspect of the present invention, there is provided a mobile communication terminal comprising a data selection condition setting section for arbitrarily selecting at least one of a plurality of data selection condition candidates to set the selected one as a data selection condition, a data selecting section for regularly selecting user data from those stored in the mobile communication terminal according to the data selection condition(s) set by the data selection condition setting section, and a backup data transmitting section for transmitting the user data selected by the data selecting section as backup data.

In accordance with the seventh aspect of the present invention, there is provided a mobile communication terminal comprising a data selecting section for regularly selecting user data from those stored in the mobile communication terminal according to a plurality of data selection conditions, and a backup data transmitting section for transmitting the user data selected by the data selecting section as backup data.

In accordance with the eighth aspect of the present invention, there is provided a backup device for storing backup data of user data stored in a mobile communication terminal, comprising a data selection condition setting section for arbitrarily selecting at least one of a plurality of data selection condition candidates to set the selected one as a data selection condition, and a data selection condition informing section for informing the mobile communication terminal of the data selection condition(s) set by the data selection condition setting section.

In accordance with the ninth aspect of the present invention, there is provided a backup device for storing backup data of user data stored in a mobile communication terminal, comprising a data selection condition setting section for setting a plurality of data selection conditions, and a data selection condition informing section for informing the mobile communication terminal of the data selection conditions set by the data selection condition setting section.

In accordance with the tenth aspect of the present invention, there is provided a data backup system for a mobile communication terminal, wherein a backup device stores therein or in a recordable storage medium backup data of user data stored in a mobile communication terminal through a communication network, the mobile communication terminal or the backup device includes a data selection condition setting section for arbitrarily selecting at least one of a plurality of data selection condition candidates to set the selected one as a data selection condition, and the mobile communication terminal includes a data selecting section for selecting user data that satisfy the data selection condition(s) set by the data selection condition setting section from those stored in the mobile communication terminal and a backup data transmitting section for transmitting the user data selected by the data selecting section as backup data to the backup device.

In accordance with the eleventh aspect of the present invention, there is provided a data backup system for a mobile communication terminal, wherein a backup device stores therein or in a recordable storage medium backup data of user data stored in a mobile communication terminal through a communication network, and the mobile communication terminal includes a data selecting section for selecting user data from those stored in the mobile communication terminal according to a plurality of data selection conditions and a backup data transmitting section for transmitting the user data selected by the data selecting section as backup data to the backup device.

The backup device may include a downloading section for downloading the backup data which the backup device stores therein or in the recordable storage medium to a communication terminal other than the mobile communication terminal through the communication network, and a media converting section for converting the backup data to a format compatible with the communication terminal.

The backup device may include a downloading section for downloading the backup data which the backup device stores therein or in the recordable storage medium to a communication terminal other than the mobile communication terminal through the communication network, and an authenticating section for determining whether or not to allow the download.

In accordance with the twelfth aspect of the present invention, there is provided a data backup system for a mobile communication terminal, wherein a backup device stores therein or in a recordable storage medium backup data of user data stored in a mobile communication terminal through a communication network, and the backup device includes a downloading section for downloading the backup data which the backup device stores therein or in the recordable storage medium to a communication terminal other than the mobile communication terminal through the communication network, an authenticating section for determining whether or not to allow the download, and a login limiting section for limiting the number of logins available for downloading the backup data by the downloading section.

In accordance with the thirteenth aspect of the present invention, there is provided a data backup system for a mobile communication terminal, wherein a backup device stores therein or in a recordable storage medium backup data of user data stored in a mobile communication terminal through a communication network, and the backup device includes a downloading section for downloading the backup data which the backup device stores therein or in the recordable storage medium to a communication terminal other than the mobile communication terminal through the communication network, an authenticating section for determining whether or not to allow the download, and a login limiting section for limiting login time available for downloading the backup data by the downloading section.

In accordance with the fourteenth aspect of the present invention, there is provided a data backup method for a mobile communication terminal, in which a backup device stores therein or in a recordable storage medium backup data of user data stored in a mobile communication terminal through a communication network, the method comprising the steps of selecting by the mobile communication terminal or the backup device at least one of a plurality of data selection condition candidates to set the selected one as a data selection condition, selecting by the mobile communication terminal user data from those stored in the mobile communication terminal according to the data selection condition(s), and transmitting, by the mobile communication terminal, the selected user data as backup data to the backup device.

Incidentally, in the aforementioned aspects of the present invention, the data selection condition candidates may include a condition based on the arbitrary designation of a user data file by the user of the mobile communication terminal, a condition based on the amount of each user data, a condition based on the type of each user data, a condition based on the confidentiality of each user data, and a condition based on the location of the mobile communication terminal.

In accordance with the fifteenth aspect of the present invention, there is provided a data backup method for a mobile communication terminal, in which a backup device stores therein or in a recordable storage medium backup data of user data stored in a mobile communication terminal through a communication network, the method comprising the steps of selecting by the mobile communication terminal user data from those stored in the mobile communication terminal according to a plurality of data selection conditions, and transmitting the selected user data as backup data from the mobile communication terminal to the backup device.

In accordance with the sixteenth aspect of the present invention, there is provided a data backup method for a mobile communication terminal, in which a backup device stores therein or in a recordable storage medium backup data of user data stored in a mobile communication terminal through a communication network, the method comprising the steps of dividing by the mobile communication terminal the backup data of user data into one or more blocks of information, and transmitting the backup data with respect to each information block to transmit user data stored in the mobile communication terminal as backup data.

The mobile communication terminal may transmit only updated information blocks when transmitting the backup data with respect to each information block.

In accordance with the seventeenth aspect of the present invention, there is provided a backup data transmission method for a mobile communication terminal to transmit backup data of user data stored in the mobile communication terminal, the method comprising the steps of arbitrarily selecting at least one of a plurality of data selection condition candidates to set the selected one as a data selection condition, selecting user data that satisfy the data selection condition(s) from those stored in the mobile communication terminal, and transmitting the selected user data as backup data.

In accordance with the eighteenth aspect of the present invention, there is provided a backup data transmission method for a mobile communication terminal to transmit backup data of user data stored in the mobile communication terminal, the method comprising the steps of selecting user data from those stored in the mobile communication terminal according to a plurality of data selection conditions, and transmitting the selected user data as backup data.

As is described above, in accordance with the present invention, the mobile communication terminal selects user data to be transmitted as backup data, thereby transmitting the backup data. With this process, a limitation is imposed on the amount of transmission data, and network traffic can be reduced as compared to the conventional techniques. Consequently, it is possible to solve the problem that the inefficient use of radio bands causes lack of lines. In addition, the uploading or downloading of backup data requires less time, which reduces the period during which the user cannot use the mobile communication terminal for another purpose. Thus, convenience for the user can be improved. Further, as conditions used for selecting user data to be transmitted as backup data, one or more data selection conditions are arbitrarily selected from a plurality of data selection condition candidates. Therefore, user data that meets the preference of the user can be selected as backup data. Still further, if user data to be transmitted as backup data are selected based on a plurality of data selection conditions, backup data can be selected more carefully and meticulously to meet the preference of the user.

BRIEF DESCRIPTION OF THE DRAWINGS

The exemplary aspects and features of the present invention will become more apparent from the consideration of the following detailed description taken in conjunction with the accompanying drawings in which:

FIG. 2(a) is a block diagram showing the construction of a mobile communication terminal used in the data backup system;

FIG. 2(b) is a diagram showing the appearance of the mobile communication terminal;

FIG. 5(a) is a flowchart for explaining an example of operation to set a data selection condition;

FIG. 5(b) is a diagram showing an example of a screen display to set a data selection condition;

FIG. 6 is a diagram showing an example of a screen display to set a data selection condition;

FIG. 7 is a diagram showing another example of a screen display to set a data selection condition;

FIG. 8 is a diagram showing another example of a screen display to set a data selection condition;

FIG. 9(a) is a diagram showing another example of a screen display to set a data selection condition;

FIG. 9(b) is a diagram showing another example of a screen display to set a data selection condition;

FIG. 10(a) is a diagram showing yet another example of a screen display to set a data selection condition;

FIG. 10(b) is a diagram showing yet another example of a screen display to set a data selection condition;

FIG. 11 is a flowchart showing another example of the operation of the data backup system;

DESCRIPTION OF THE PREFERRED EMBODIMENT

Figure 1:
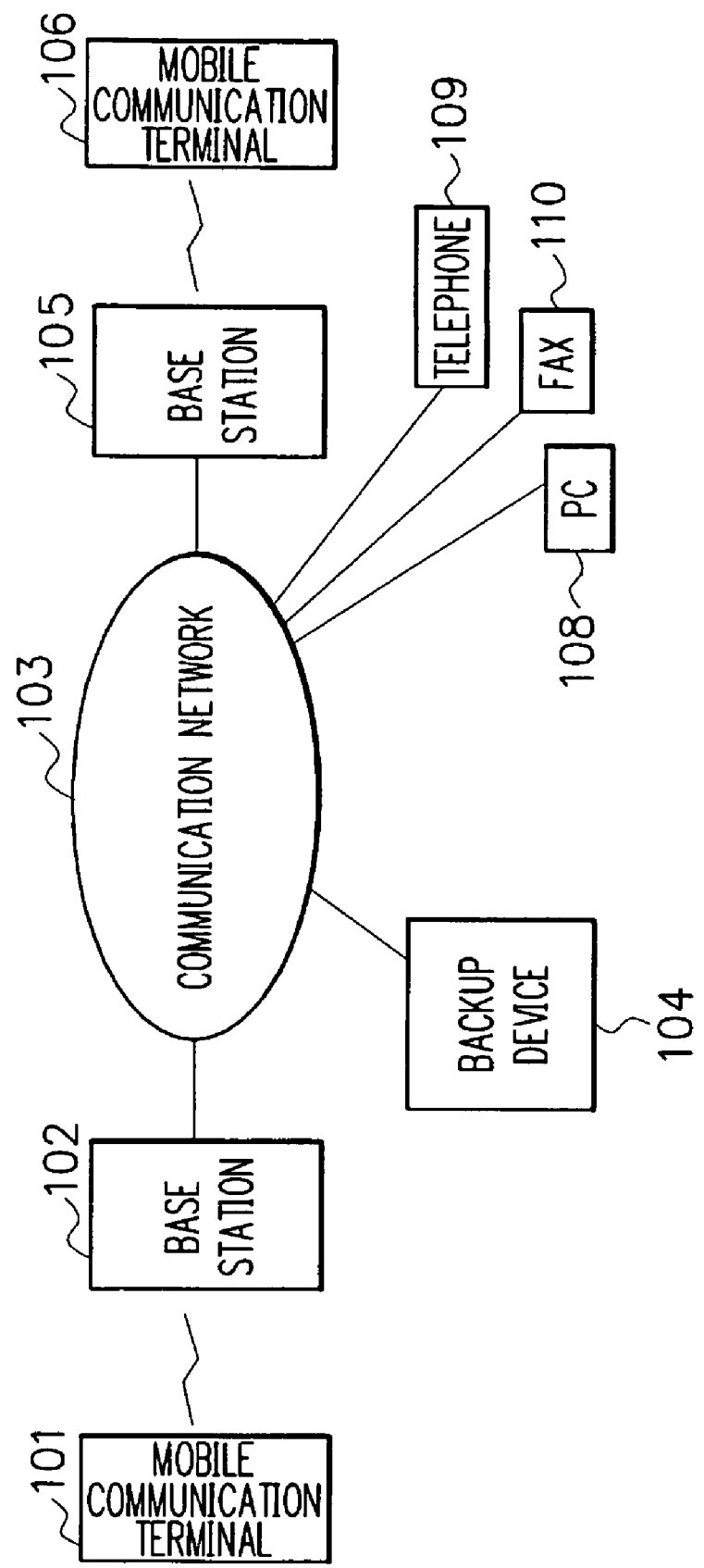
FIG. 1 is a diagram showing a network structure to illustrate a data backup system for a mobile communication terminal according to an embodiment of the present invention.

Referring now to the drawings, a description of a preferred embodiment of the present invention will be given in detail.

FIG. 1 is a diagram showing a data backup system for a mobile communication terminal according to an embodiment of the present invention. Referring to FIG. 1, the data backup system comprises mobile communication terminals 101 and 106, base stations 102 and 105, a communication network 103, a backup device 104, a PC (Personal Computer) 108, a telephone 109, and a FAX (facsimile) 110. In the data backup system, user data stored in the mobile communication terminal 101 are selectively backed up in the backup device 104 through the base station 102 and the communication network 103. The user data indicate data stored in the mobile communication terminal 101 by the user, etc. including a telephone directory, an address book, incoming/outgoing call history, e-mail messages, schedules, still and moving images, voice or sound, music or melodies, electronic money information, electronic ticket information, customer information, and site URL (Uniform Resource Locater) information. The user data may also include information as to the configuration of the mobile communication terminal 101 set by the user or the like. The backup device 104 stores backups or backup data of the user data stored in the mobile communication terminal 101. The backup data stored in the backup device 104 can be downloaded to the mobile communication terminal 101 through the communication network 103 and the base station 102. The backup data can also be downloaded to the mobile communication terminal 106 other than the terminal 101 through the communication network 103 and the base station 105. Additionally, it is possible to obtain the backup data stored in the backup device 104 with another information apparatus than the mobile communication terminal, such as the PC 108, the telephone 109, and the FAX 110. In such a case, the backup data is transmitted via the communication network 103 to the information apparatus. The backup data transmitted to the telephone 109 and the FAX 110 are converted to voice and FAX signals, respectively. The backup device 104 may perform the conversion of the backup data to voice or FAX signals.

FIG. 2(a) is a block diagram showing an example of the construction of the mobile communication terminal 101 of the present invention. As can be seen in FIG. 2(a), the mobile communication terminal 101 comprises a controller 201, a memory 202, a display 203, an input unit 204, a GPS (Global Positioning System) signal receiver 205, a GPS signal processor 206, and a transmitter/receiver 207.

The controller 201 controls the selection of user data to be transmitted as backup data. Besides, the controller 201 determines whether the backup mode is ON or OFF as well as controlling the memory 202, the display 203, the input unit 204, the GPS signal receiver 205, the GPS signal processor 206, and the transmitter/receiver 207.

The memory 202 stores various types of data such as user data and map data. The display 203 displays menu screens, various types of information handled by the mobile communication terminal 101, such as text, images, maps, and the location of the terminal 101, or the like.

The input unit 204 is used by the user for setting data selection conditions to select user data. In addition, input of letters or characters, numbers, etc. and other settings can be provided through the input unit 204.

The GPS signal receiver 205 receives signals from GPS satellites, and the GPS signal processor 206 processes the GPS signals received by the receiver 205. Thereby, the controller 201 obtains information on the location of the mobile communication terminal 101. The location information of the mobile communication terminal 101 can be displayed on the display 203 together with the map data or the like stored in the memory 202. The transmitter/receiver 207 transmits/receives radio signals.

The mobile communication terminal 101 is also provided with the same components as those of an ordinary one, including call transmitter and receiver for conversation, and a speaker for informing the user of an incoming call, etc. by voice or sound messages, a ringing tone or the like.

FIG. 2(b) is a diagram showing an example of the appearance of the mobile communication terminal 101 of the present invention. Referring to FIG. 2(b), the upper half of the mobile communication terminal 101 serves as a display section 210, while the lower half serves as an input section 211. The input section 211 includes input keys 212 for inputting letters or characters, numbers, etc., a cursor key 213 for changing the cursor position on the screen of the display section 210, an enter key 214 used for menu options, etc., and an edit key 215 for displaying the edit menu on the screen. Although not shown in FIG. 2(b), the input section 211 may further include other keys as with an ordinary mobile communication terminal. For example, the input section 211 may include a function key having various functions depending on events. Besides, the display section 210 may be provided with a pressure-sensitive screen so that input can be provided with a touch pen or the like.

Figure 3:
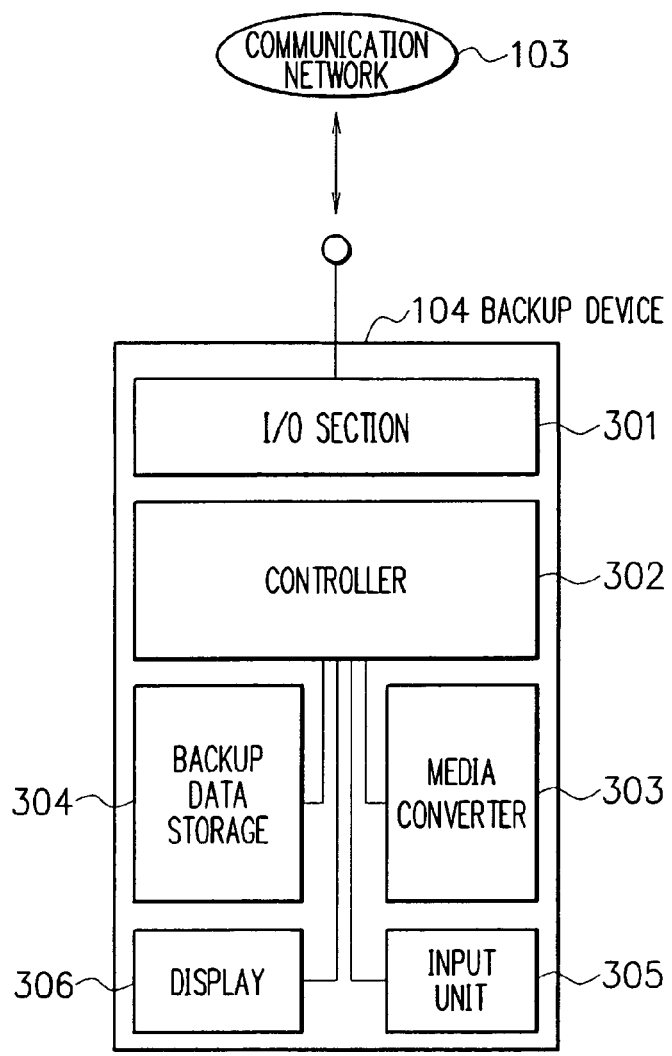
FIG. 3 is a block diagram showing the construction of a backup device used in the data backup system.

FIG. 3 is a block diagram showing the construction of the backup device 104 of the present invention. As can be seen in FIG. 3, the backup device 104 comprises an I/O (Input/Output) section 301, a controller 302, a media converter 303, a backup data storage 304, an input unit 305, and a display 306.

The I/O section 301 serves as an I/O interface with the communication network 103 to transmit/receive signals to/from the network 103.

The controller 302 has several functions, as, for example, to request the mobile communication terminal 101 to transmit data to be backed up via the communication network 103, to inform the terminal 101 of data selection conditions, to control the entire operation of respective components of the backup device 104, and to perform authentication using the telephone number, a password or an identification number of the terminal 101 previously registered. In addition, when requested by the mobile communication terminal 101, another terminal 106, or an information apparatus such as the PC 108, the telephone 109, and the FAX 110 to download backup data, the controller 302 fetches the requested data from the backup data storage 304 to download the data.

The input unit 305 is used for setting data selection conditions to select user data to be transmitted from the mobile communication terminal 101 as backup data. Incidentally, data selection conditions may be set by either or both the mobile communication terminal 101 and the backup device 104.

The backup data storage 304 stores backups of the user data obtained from the mobile communication terminal 101. The backup data storage 304 may be a hard disk or a storage medium built in the backup device 104. Such hard disk, however, is cited merely by way of example and without limitation, and others can be used so long as they have a function of storing backup data. For example, an external storage medium detachable from the backup device 104, such as a CD (Compact Disc) and a data card, may be employed as the backup data storage 304.

The media converter 303 converts backup data, which have been read out from the backup data storage 304 to be downloaded to a terminal, to a format compatible with the media of the terminal. More specifically, when data are transmitted to the telephone 109, the media converter 303 converts, for example, text data to voice data reproducible by the voice/data telephone 109. When data are transmitted to the FAX 110, the media converter 303 converts, for example, text data, voice data or image data to FAX signals. Further, when data are transmitted to the PC 108, the media converter 303 converts, for example, text data, voice data, or still or moving image data to a format displayable and reproducible by the PC 108. There is found a description of the media conversion function in Japanese Patent Application laid open No. 2000-341425.

In the following, the operation of the data backup system of this embodiment will be described.

Figure 4:
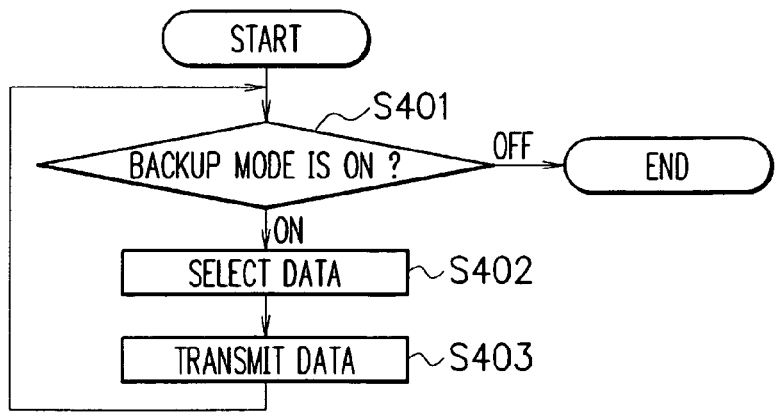
FIG. 4 is a flowchart showing an example of the operation of the data backup system.

FIG. 4 is a flowchart showing an example of the operation of the data backup system for a mobile communication terminal according to the embodiment of the present invention. Referring to FIG. 4, first, a determination is made as to whether or not the mobile communication terminal 101 is in backup mode: whether the backup mode is ON or OFF (step S401). When the mobile communication terminal 101 is not in backup mode (step S401, OFF), the backup operation ends. The user can arbitrarily switch ON/OFF the backup mode with the input unit 204 of the mobile communication terminal 101. The determination as to the backup mode is made by the controller 201 of the mobile communication terminal 101, or may be made by the controller 302 of the backup device 104. In the latter case, the controller 302 informs the mobile communication terminal 101 of the result of the determination.

When the mobile communication terminal 101 is in backup mode (step S401, ON), based on data selection conditions preset by the process shown in the flowchart of FIG. 6(a), data to be transmitted as backup data are selected from all user data in the mobile communication terminal 101 (step S402). The data selection conditions are determined according to user preference. On the other hand, data to be transmitted as backup data are selected under the control of the controller 201 of the mobile communication terminal 101.

After that, the mobile communication terminal 101 transmits only the data selected from all user data to be backed up (step S403).

Consequently, a limitation is imposed on the total amount of data to be transmitted as backup data, which optimizes or reduces network traffic as compared to the case where all user data are backed up. Moreover, data selection conditions are determined according to user preference. Thereby, an improvement is achieved in user selectivity of data to be transmitted. Thus, the user can intentionally prevent data that he/she does not wish to transmit, such as highly confidential data, from being transmitted.

FIG. 5(a) is a flowchart for explaining step S402 in FIG. 4 to set data selection conditions for selecting backup data to be transmitted. Data selection conditions can always be set based on user preference. Referring to FIG. 5(a), first, data selection condition candidates are displayed on the display 203 according to input provided through the input unit 204 of the mobile communication terminal 101 (step S601). FIG. 5(b) is a diagram showing an example of a data selection condition candidate list displayed on the display 203. As shown in FIG. 5(b), examples of items in the data selection condition candidate list 603 include "arbitrary selection", "data amount", "data type", "confidentiality", and "location", each of which will be described in detail below.

Next, one or more data selection conditions are selected from the data selection condition candidate list 603 according to input provided by the user through the input unit 204 of the mobile communication terminal 101 (step S602). More specifically, as shown in FIG. 5(b), the user checks or clicks the checkbox 605 of the item that he/she wishes to select. In order to check the checkbox 605, the user positions the cursor 604 on a desired item using the cursor key 213, and then depresses the enter key 214. The user can uncheck the checkbox 605 by depressing the enter key 214 again when the cursor 604 is residing on the item.

In addition, a combination of data selection conditions can be designated by checking an item of combined condition 608. For example, when the checkbox of "and" is checked, data are selected under an AND condition that satisfies all the checked items of data selection conditions. When the checkbox of "or" is checked, data are selected under an OR condition that satisfies any of all the checked items of data selection conditions. Besides, when the checkbox of "free" is checked, data are selected under an arbitrary combined condition otherwise determined. The user can arbitrarily set a combined condition on the edit menu displayed on the screen by depressing the edit key 215 when the cursor 604 is residing on "free". The combined condition is expressed by a logical (Boolean) expression, such as "1 or 2" and "3 or 4". In this case, the combined condition satisfies condition 1 or 2 and condition 3 or 4. Incidentally, the numbers 1 to 4 each indicate an item number in the data selection condition candidate list 603. After the above process, the user positions the cursor 604 on "END" 607, and then depresses the enter key 214 to complete the setting operation.

In the following, a description will be given in detail of each data selection condition.

FIG. 6 is a diagram showing an example of a screen display to arbitrarily set data selection conditions. The condition setting menu of FIG. 6 is displayed on the screen when the user positions the cursor 604 on "1. arbitrary selection" in FIG. 5(b), and then depresses the edit key 215. Incidentally, "arbitrary selection" indicates that the user arbitrarily selects and specifies a folder or a file. By the selection of a folder, all files in the folder are selected. In order to select user data (a folder or a file), the user clicks the checkbox 703 of a desired item in a folder/file list 701. The user data selected here correspond to the backup data selected in step S402 of FIG. 4. Thereby, the user can select data that he/she wishes to back up, and only the selected data are transmitted as backup data. After the above process, the user positions the cursor 702 on "END" 704, and then depresses the enter key 214 to complete the setting operation.

The aforementioned operation on the display screen is performed similarly in the following cases, and the description thereof will not be repeated.

FIG. 7 is a diagram showing an example of a screen display to set a data selection condition based on the amount of user data. The condition setting menu of FIG. 7 is displayed to set the maximum amount of user data per file to be transmitted as backup data. As shown in FIG. 7, menu items may include, for example, "5 MB (megabyte) or less", "1 MB or less", . . . , and "arbitrary setting". When selecting "arbitrary setting", the user can arbitrarily specify the maximum amount of data. In FIG. 7, indications in the menu items, such as "moving image size", "still image size", etc., are for illustration of an idea of the maximum amount of fail data, and not intended to specify the type of a file. Under the control of the controller 201 of the mobile communication terminal 101, files each having a data amount equal to or less than the maximum amount specified here are selected as the backup data in step S402 of FIG. 4. Since the user can specify the maximum amount of data to be backed up, user data in an amount per file exceeding the maximum amount are not to be transmitted as backup data. Consequently, a limitation is imposed on the total amount of backup data to be transmitted, which optimizes or reduces network traffic.

FIG. 8 is a diagram showing an example of a screen display to set data selection conditions based on the type of user data. As shown in FIG. 8, menu items may include, for example, "moving image", "still image, "text message", . . . , and "arbitrary setting". One or a plurality of types of data can be selected. In FIG. 8, "telephone directory", and "e-mail" are selected. In this case, under the control of the controller 201 of the mobile communication terminal 101, telephone directory files and e-mail fails are selected as the backup data in step S402 of FIG. 4. The extension of each file may be used to identify the file type for the selection. Thus, user data not of the type(s) specified by the user are not to be transmitted as backup data. Consequently, a limitation is imposed on the total amount of backup data to be transmitted, which optimizes or reduces network traffic.

FIG. 9(a) is a diagram showing an example of a screen display to set a data selection condition based on the confidentiality of user data. The condition setting menu of FIG. 9(a) is displayed to set the level of confidentiality of user data to be transmitted as backup data. For example, levels 3, 2 and 1 are assigned to data in descending order of confidentiality. FIG. 9(a) is a diagram showing an example of a screen display of confidentiality level information. In the example of FIG. 9(a), electronic money information is designated as level 3, a telephone directory is designated as level 2, and site URL information is designated as level 1. The assignment of levels may be automatically performed by the mobile communication terminal 101 based on predetermined conditions, or may be performed by the user. Under the control of the controller 201 of the mobile communication terminal 101, data at a confidentiality level equal to or less than the level specified and set here are selected as the backup data in step S402 of FIG. 4. Thus, user data not of the type(s) specified by the user (at a level higher than the level specified by the user) are not to be transmitted as backup data. Consequently, a limitation is imposed on the total amount of backup data to be transmitted, which optimizes or reduces network traffic. In addition, highly confidential data that may be eavesdropped can be set, individually or partially, not to be transmitted according to user preference.

FIGS. 10(a) and 10(b) are diagrams showing examples of screen displays to set data selection conditions based on the location of the mobile communication terminal 101. The condition setting menu of FIG. 10(a) is displayed to set the location of the mobile communication terminal 101 according to which user data are transmitted as backup data. For example, The user may hardly update image data at his/her home. Or, when the user uses a terminal capable of wireless LAN (Local Area Network) communication in the wireless LAN area, he/she may wish to transmit higher volume or confidential data as backup data in the wireless LAN area. In order to set data selection conditions based on location information, the user first selects one or more desired items from the condition setting menu of FIG. 10(a) to set location conditions, and then displays the menu screen of FIG. 10(b). The menu screen of FIG. 10(b) allows the user to set data selection conditions for the transmission of backup data when the mobile communication terminal 101 is in the location(s) specified by him/her. The operation on the menu screen of FIG. 10(b) is basically similar to that described previously in connection with FIG. 5(b) except that the user can specify whether or not to transmit data. By checking "NO" of transmission YES/NO checkboxes 1105, the user can set data as the one not to be transmitted. The location of the mobile communication terminal 101 can be detected by the GPS function of the terminal 101. Besides, it may be detected that the user enters the wireless LAN area by a signal received from an access point. Under the control of the controller 201 of the mobile communication terminal 101, based on the location conditions set here, data are selected according to the location of the terminal 101 as the backup data in step S402 of FIG. 4. Thus, transmission data to be backed up can be selected in consideration of location information according to user preference.

While the operation of the data backup system for a mobile communication terminal has been described referring to FIG. 4, it is not so limited.

FIG. 11 is a flowchart showing another example of the operation of the data backup system. As can be seen in FIG. 11, for example, the steps of determining whether or not it is transmission timing or time to transmit backup data (step S502), selecting updated data (step S504), and updating the backup mode (step S506) may be performed in addition to the steps of FIG. 4. Backup data may be transmitted at regular intervals or at a time predetermined as transmission timing. If not in the transmission timing (step S502/NO), the mobile communication terminal 101 does not transmit backup data. In other words, after selecting user data to be transmitted as backup data in step S503, the mobile communication terminal 101 may transmit the selected data at regular intervals or at a predetermined time. The determination as to whether or not it is the transmission timing may be made by the mobile communication terminal 101 or the backup device 104. In the latter case, the backup device 104 informs the mobile communication terminal 101 of the result of the determination.

If in the transmission timing (step S502/YES), user data to be transmitted as backup data are selected (step S503). Subsequently, from the selected user data, data which have been updated (data in which a change, addition, etc. have been made) compared to those selected in the last selection are extracted as backup data (step S504). Thereby, only the updated data are transmitted as backup data (step S505). Thus, it is possible to prevent such useless operation as to transmit the same data again.

After that, the backup mode is released or continued based on predetermined conditions (step S506). When backups of data have been set to be performed once, the backup mode is released at this point. As a result, it is determined that the mobile communication terminal 101 is not in backup mode (step S501, OFF), and the backup operation ends. On the other hand, when backups of data have been set to be performed at regular intervals, the backup mode continues until a backup mode termination condition determined separately is satisfied. The user can set the backup mode termination condition by providing input to the mobile communication terminal 101. Thus, when the mobile communication terminal 101 is set in the backup mode, user data are automatically backed up at regular intervals or at a predetermined time even if the user forgets to back up data.

Figure 12:
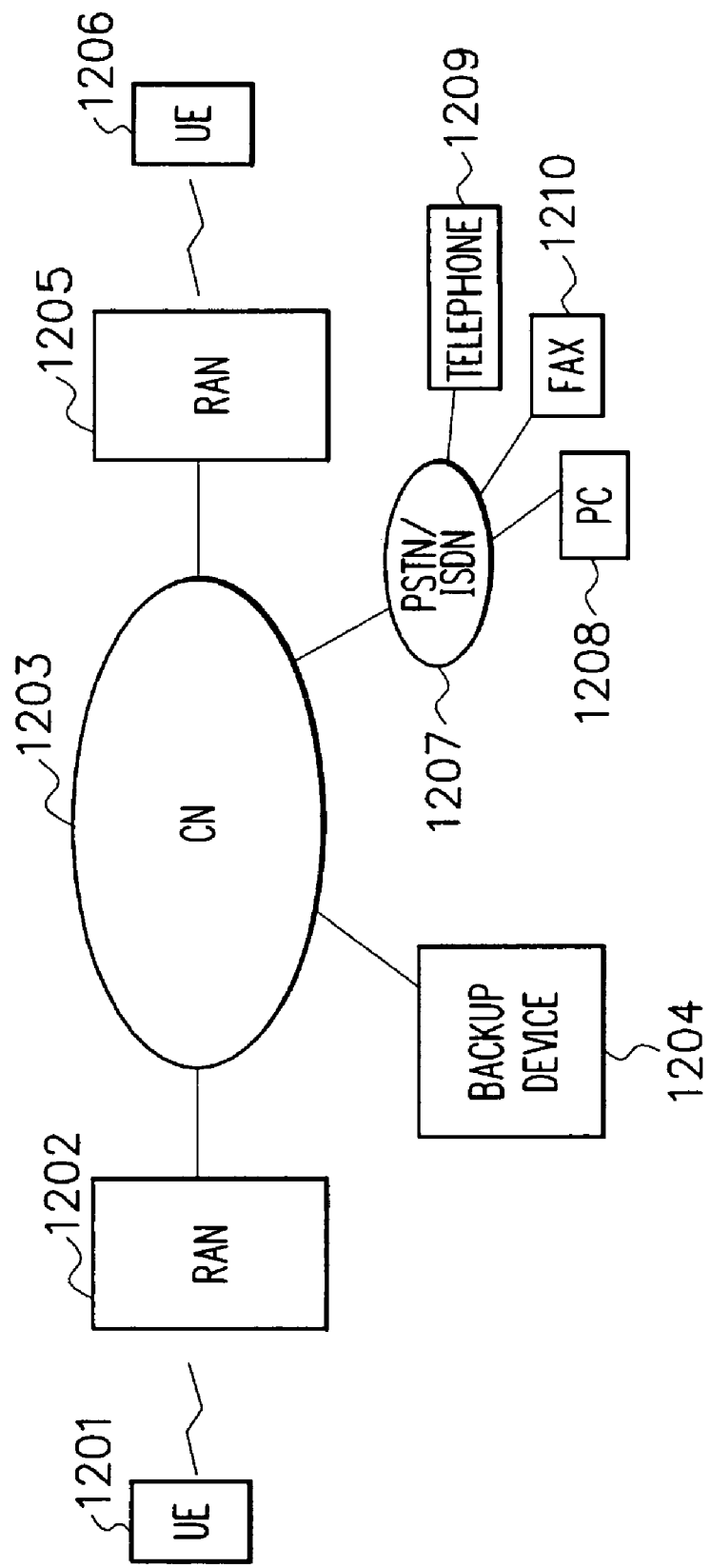
FIG. 12 is a diagram showing a network structure to illustrate another example of a data backup system for a mobile communication terminal.

FIG. 12 is a diagram showing an specific example of the data backup system of FIG. 1. In the example of FIG. 12, the data backup system is applied to a W-CDMA (Wideband Code Division Multiple Access) system defined by the 3GPP (3rd Generation Partnership Project) as a global standard for mobile communications. The data backup system comprises UE (User Equipment) 1201 and 1206 as mobile communication terminals, RANs (Radio Access Networks) 1202 and 1205 as base stations or base station controllers, a CN (Core Network) 1203 as a communication network, a backup device 1204, a PSTN/(Public Switched Telephone Network)/ISDN (Integrated Services Digital Network) 1207, a PC 1208, a telephone 1209, and a FAX 1210. In the data backup system, user data stored in the UE 1201 are backed up in the backup device 1204 through the RAN 1202 and the CN 1203. The backup data stored in the backup device 1204 can be downloaded to the UE 1201 through the CN 1203 and the RAN 1202. The backup data can also be downloaded to the UE 1206 other than the UE 1201 through the CN 1203 and the RAN 1205. Additionally, it is possible to obtain the backup data with another information apparatus than the UE, such as the PC 1208, the telephone 1209, and the FAX 1210 through the CN 1203 and the PSTN/ISDN 1207.

In the following, the operation of the data backup system of FIG. 12 will be described.

Figure 13:
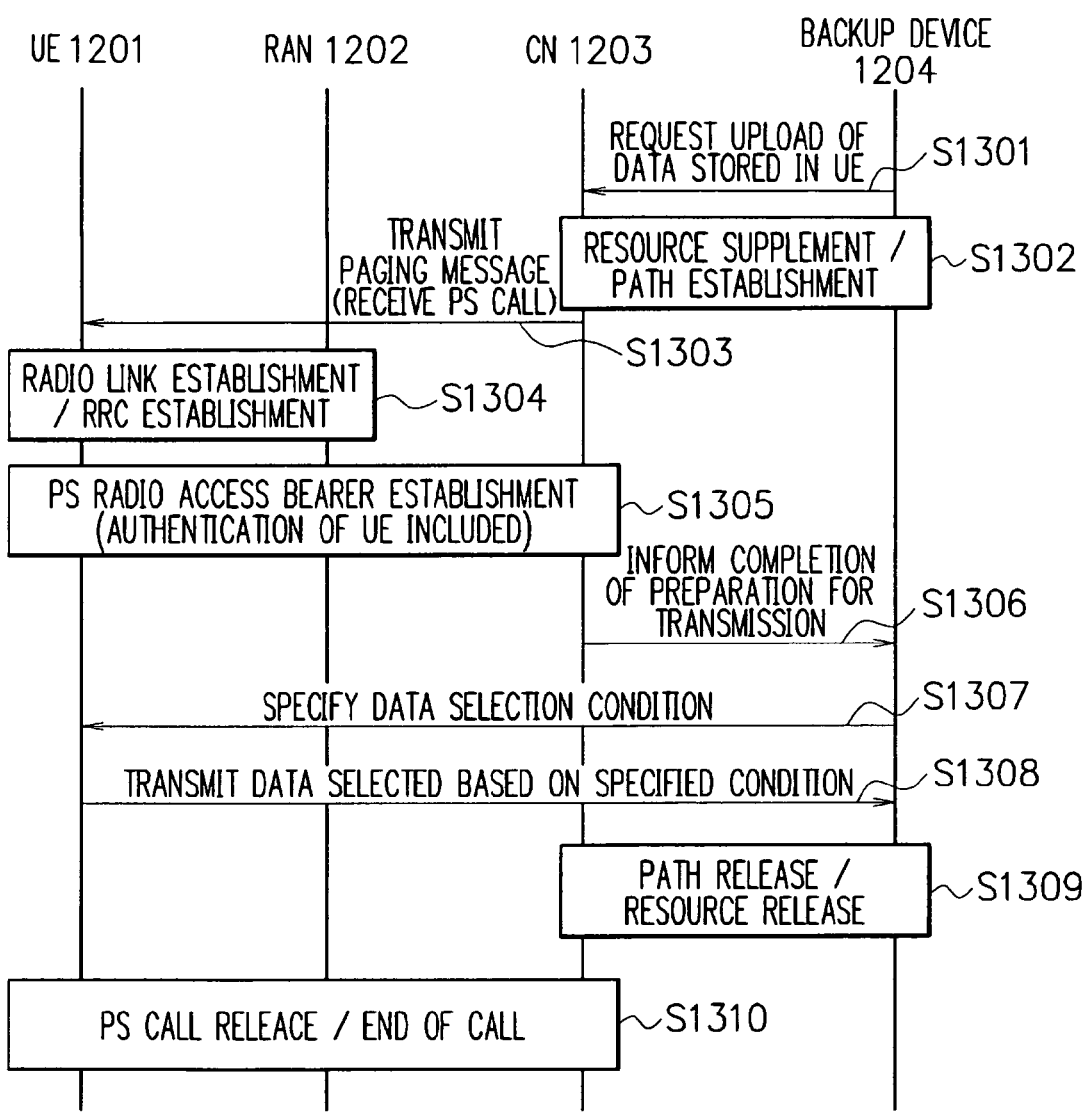
FIG. 13 is a sequence diagram showing an example of the operation of the data backup system.

FIG. 13 is a sequence diagram showing an example of the operation of the data backup system. Referring to FIG. 13, first, the backup device 1204 requests the CN 1203 to upload data stored in the UE 1201 (step S1301). Then, resources are supplemented and a path is established between the CN 1203 and the backup device 1204 (step S1302). Subsequently, the CN 1203 transmits a paging message to the UE 1201 (step S1303). After the RRC (Radio Resource Control) protocol is established and also a wireless link is established between the UE 1201 and the RAN 1202 (step S1304), a PS (Packet Switched) radio access bearer is established between the UE 1201 and the CN 1203 (step S1305). The CN 1203 informs the backup device 1204 that preparation for transmission of data stored in the UE 1201 has been completed (step S1306). Having informed of the completion of the preparation, the backup device 1204 specifies data selection conditions to the UE 1201 (step S1307). Based on the data selection conditions specified by the backup device 1204, the UE 1201 selects data as backup data, and transmits the backup data to the backup device 1204 (step S1308). When the backup device 1204 receives all the backup data from the UE 1201, the resources are released and the connection path is released between the CN 1203 and the backup device 1204 (step S1309). After that, the PS call is released to complete the call between the UE 1201 and the CN 1203 (step S1310). This operation may be performed regularly by request from the backup device 1204.

Figure 14:
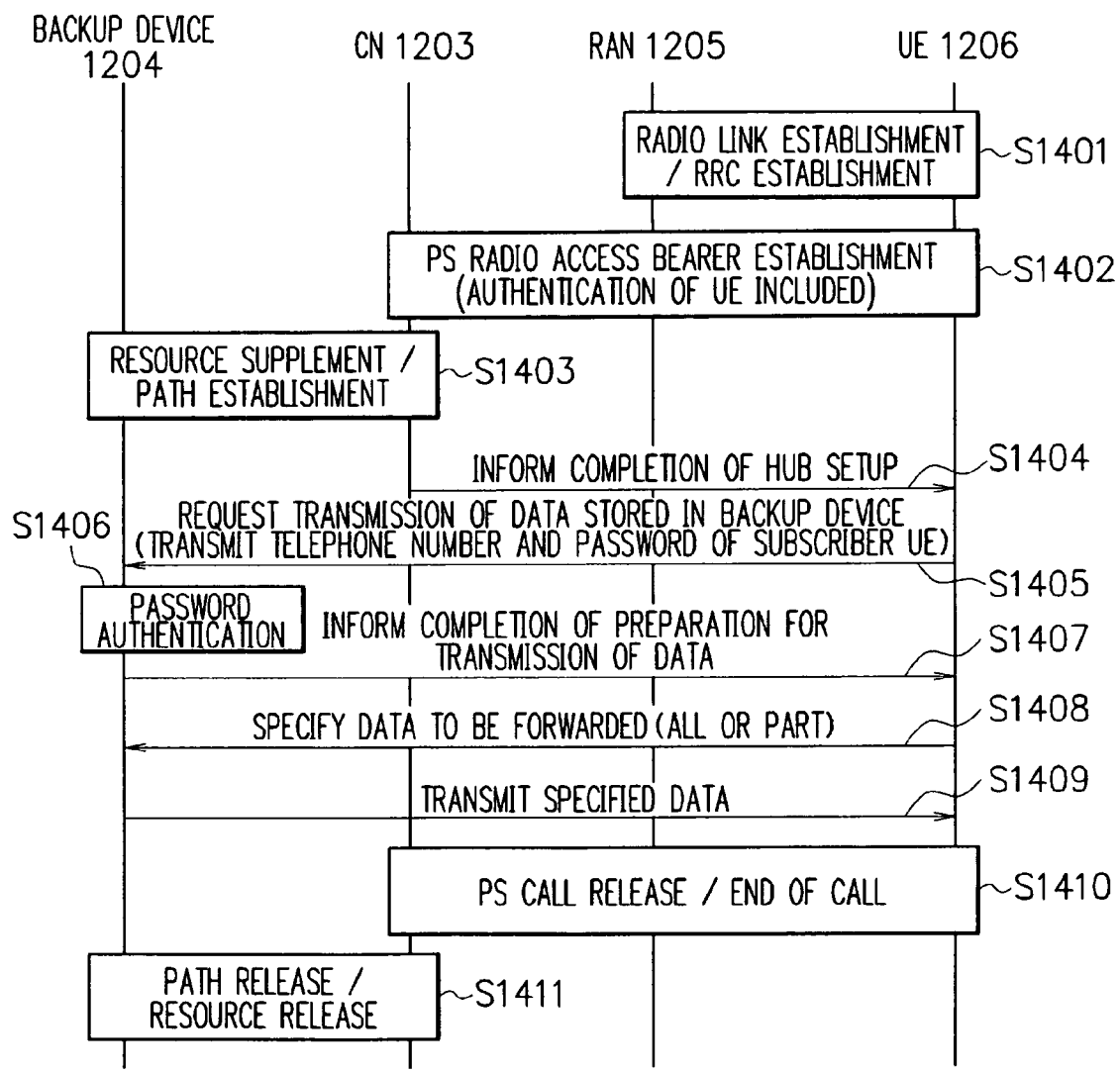
FIG. 14 is a sequence diagram showing another example of the operation of the data backup system.
Figure 15:
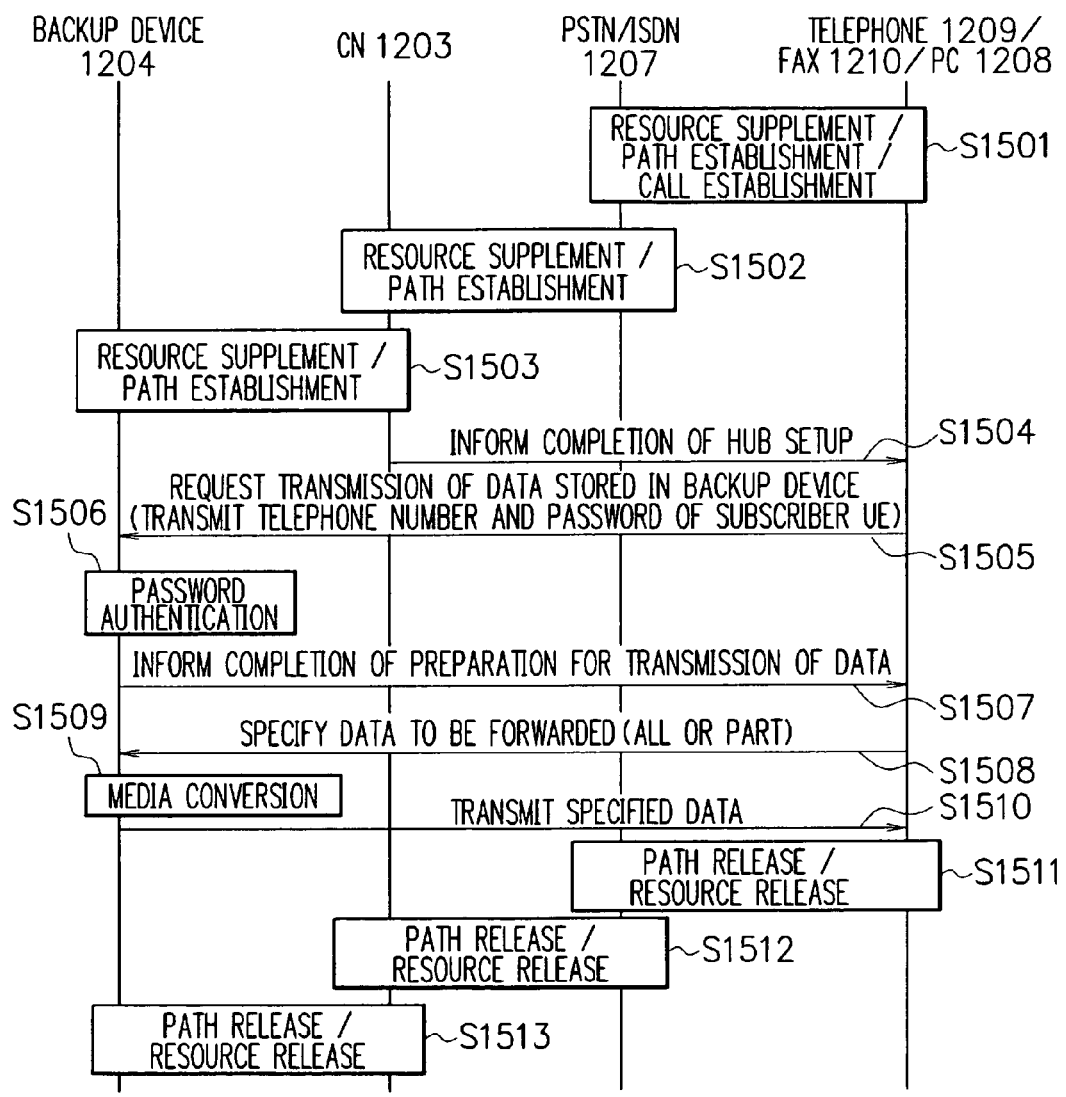
FIG. 15 is a sequence diagram showing yet another example of the operation of the data backup system.

FIG. 14 is a sequence diagram showing the operation of the data backup system when the UE 1206 downloads backup data from the backup device 1204. As can be seen in FIG. 14, after the RRC protocol is established and also a wireless link is established, in response to a request from the UE 1206 other than the UE 1201, between the UE 1206 and the RAN 1205 (step S1401), a PS radio access bearer is established between the UE 1206 and the CN 1203 (step S1402). Then, the CN 1203 supplements resources as well as establishing a path between the CN 1203 and the backup device 1204 (step S1403), thereby informing the UE 1206 of the completion of the path establishment (step S1404). In order to obtain the backup data of the UE 1201, the UE 1206 transmits the telephone number and password of the UE 1201 to the backup device 1204 (step S1405). The backup device 1204 compares the telephone number and password with authentication information, such as a telephone number and a password, of the UE 1201 previously registered to authenticate them (step S1406). The backup device 1204 informs the UE 1206 that preparation for transmission of data stored therein has been completed (step S1407). Incidentally, at each authentication, the controller 302 may send an inquiry to the HLR (Home Location Register) that manages subscriber information in the CN 1203 to obtain the authentication information. Having informed of the completion of the preparation, the UE 1206 specifies desired backup data to be forwarded (step S1408), and receives the specified data from the backup device 1204 (step S1409). On completion of the download of the backup data, the UE 1206 releases the PS call to complete the call (step S1410), and thereby, the resources are released and the connection path is released between the CN 1203 and the backup device 1204 (step S1411).

FIG. 14 is a sequence diagram showing the operation of the data backup system when the PC 1208, the telephone 1209, or the FAX 1210 downloads backup data from the backup device 1204. Referring to FIG. 14, in response to a request from the PC 1208, the telephone 1209, or the FAX 1210, resources are supplemented, a path is established and a call is established between the PSTN/ISDN 1207 and the PC 1208, the telephone 1209, or the FAX 1210 (step S1501). Then, resources are supplemented and a path is established between the CN 1203 and the PSTN/ISDN 1207 (step S1502) as well as between the CN 1203 and the backup device 1204 (step S1503). The CN 1203 informs the PC 1208, the telephone 1209, or the FAX 1210 of the completion of the path establishment (step S1504). In order to obtain the backup data of the UE 1201, the PC 1208, the telephone 1209, or the FAX 1210 transmits the telephone number and password of the UE 1201 to the backup device 1204 (step S1505). The backup device 1204 compares the telephone number and password with authentication information, such as a telephone number and a password, of the UE 1201 previously registered to authenticate them (step S1506). The backup device 1204 informs the PC 1208, the telephone 1209, or the FAX 1210 that preparation for transmission of data stored therein has been completed (step S1507). Incidentally, at each authentication, the controller 302 may send an inquiry to the HLR that manages subscriber information in the CN 1203 to obtain the authentication information. Having informed of the completion of the preparation, the PC 1208, the telephone 1209, or the FAX 1210 specifies desired backup data to be forwarded (step S1508). The backup device 1204 converts the specified backup data to a format compatible with the media of the PC 1208, the telephone 1209, or the FAX 1210 (step S1509), and transmits the data (step S1510). After that, the resources are released and the connection path is released between the PSTN/ISDN 1207 and the PC 1208, the telephone 1209, or the FAX 1210 (step S1511), between the CN 1203 and the PSTN/ISDN 1207 (step S1512), and between the CN 1203 and the backup device 1204 (step S1513), respectively.

In the case of downloading to the UE 1206 other than the UE 1201, the PC 1208, the telephone 1209, and the FAX 1210 as is described above, in the password authentication by the backup device 1204, a limitation may be imposed on the number of logins or login time available for them to download backup data. Such limitation can protect personal information from unauthorized access or use by third parties. For example, when the number of available logins is set to twice, the number of logins with a password is limited to twice, and it is not possible to log in to the backup device 1204 more than twice. Consequently, even if the password is captured by a third party, the third party can log in up to twice. Thus, the damage from unauthorized access can be minimized or prevented from spreading. Besides, when available login time is set to 10 minutes, it is not possible to log in the backup device 1204 more than 10 minutes from the setting of the login time. The available login time may be set, for example, when the user wishes to immediately download backup data to the PC. If it is not the time at which the user wishes to download backup data, download is impossible, which protects personal information from unauthorized access or use. Incidentally, from the UE 1201 used by the user himself/herself, it is possible to set, change and release the aforementioned limitation by, for example, transmitting an ID cord that uniquely identifies the UE 1201 to the backup device 1204 so that the device 1204 can recognize that the operation is performed by the UE 1201. In addition, the backup device 1204 may have a function of disconnecting a terminal therefrom if the user or someone who attempts to download data to the terminal fails to enter the correct password more than the prescribed number of times or within the prescribed time limit on the login menu. In this case, after disconnecting the terminal, the backup device 1204 may disable the download of data. With this function, the confidentiality of user data of the UE 1201 can be ensured or preserved. Such control can be implemented by the controller of the backup device 1204. Additionally, the number of times or the time limit and the operation of the backup device 1204 with regard thereto may be preset on the device 1204 by user input to the device 1204 or the UE 1201.

When transmitting backup data to the backup device 1204, the UE 1201 generally transmits a file that has been updated. However, to further ensure the confidentiality of user data, a fail may be divided into blocks each with a specific range of memory address. In this case, generation numbers are managed with respect to each block, and only data blocks in a file which have been updated from the last transmission of backup data are transmitted with corresponding block addresses and the like. That is, the UE 1201 transmits only blocks or part of a file as backup data. Consequently, the amount of information transmitted as backup data is reduced, and an eavesdropper cannot obtain all the information contained in a file. Thus, the confidentiality of user data can be further ensured.

Figure 16:
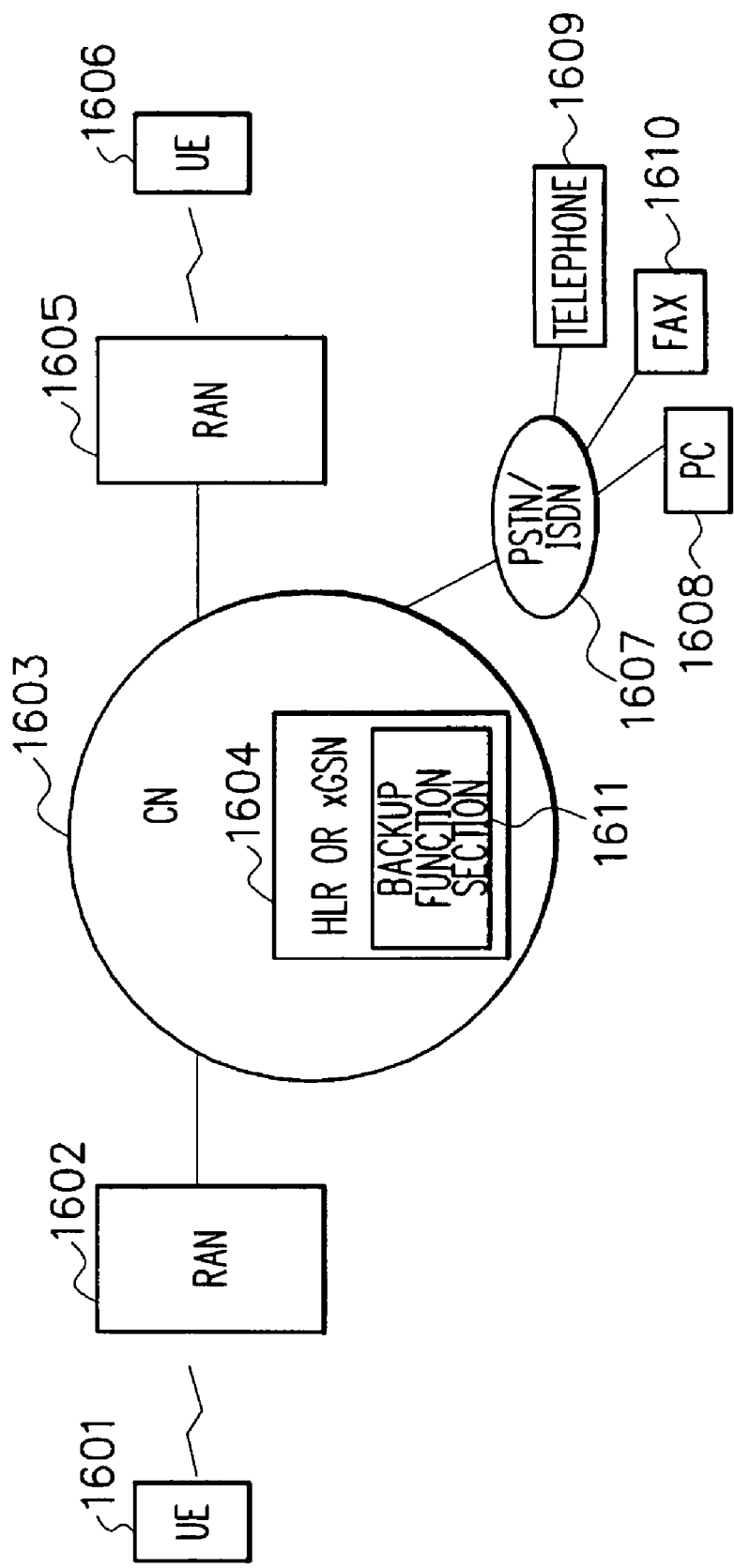
FIG. 16 is a diagram showing a network structure to illustrate another example of a data backup system for a mobile communication terminal.

FIG. 16 is a diagram showing another example of the construction of a data backup system. The data backup system of FIG. 16 is basically similar to that of FIG. 12 except for a CN 1603. In the data backup system of FIG. 16, differently from that of FIG. 12, the HLR or SGSN (Serving General packet radio service Support Node)/GGSN (Gateway General packet radio service Support Node) 1604 of the CN 1603 includes a backup function section 1611. The backup function section 1611 implements functions equivalent to those of the backup device 1204. Especially, when the HLR 1604 is provided with the backup function section 1611, information such as telephone numbers, passwords and personal identification numbers of subscribers can be unitary managed. By virtue of this construction, the usability of the backup system can be improved.

Figure 17:
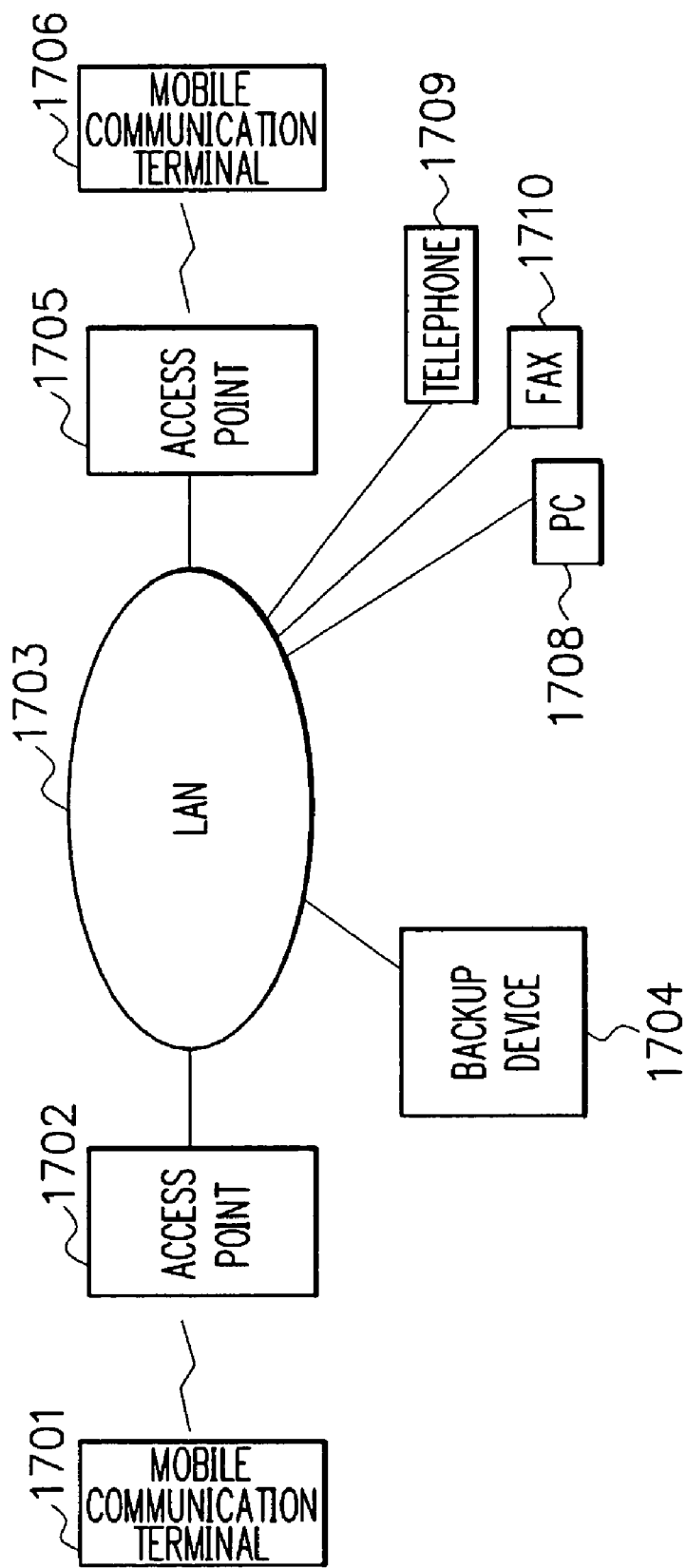
FIG. 17 is a diagram showing a network structure to illustrate yet another example of a data backup system for a mobile communication terminal.

FIG. 17 is a diagram showing yet another example of the construction of a data backup system. As shown in FIG. 17, the present invention can be applied to a system including a LAN 1703 in which mobile communication terminals 1701 and 1706 connect to the LAN 1703 through access points 1702 and 1705, respectively.

As set forth hereinabove, in accordance with the present invention, network traffic to back up data stored in a mobile communication terminal can be reduced. Thus, it is possible to solve the problem of lack of lines or the like in a communication network.

In addition, since the transmission of backup data requires less time, the period during which the user cannot use the mobile communication terminal for another purpose is reduced. Further, the user is allowed to arbitrarily set a transmission condition, as, for example, that highly confidential data are not to be transmitted. Thereby, an improvement is achieved in user selectivity of backup data. Thus, convenience for the user can be improved.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A mobile communication terminal comprising:
   a data selection condition setting section for selecting a combined condition and at least one of a plurality of data selection condition candidates as a data selection condition for selecting user data as user backup data;
   a data selecting section for selecting the user backup data from the user data stored in the mobile communication terminal according to the combined condition and the one or more data selection conditions set by the data selection condition setting section, the selected user data matching at least one of the selected data selection conditions, the one or more data selection conditions including a condition based on the arbitrary designation of a user data by the user of the mobile communication terminal;
   a backup mode switchable between ON and OFF; and
   a backup data transmitting section for transmitting, when the backup mode is ON, the user data selected by the data selecting section as backup data.

2. The mobile communication terminal claimed in claim 1, wherein the data selection condition candidates further include at least one selected from a condition based on an amount of each user data, a condition based on a type of each user data, a condition based on confidentiality of each user data, and a condition based on a location of the mobile communication terminal.

3. The mobile communication terminal claimed in claim 1, wherein the data selecting section regularly selects user data from those stored in the mobile communication terminal according to the one or more data selection conditions set by the data selection condition setting section.

4. A mobile communication terminal comprising:
   a data selecting section for selecting user data as user backup data from the user data stored in the mobile communication terminal according to a plurality of data selection conditions and a combined condition, the selected user data matching at least one of the plurality of data selection conditions in accordance with the combined condition, the plurality of data selection conditions including a condition based on the arbitrary designation of a user data by the user of the mobile communication terminal;
   a backup mode switchable between ON and OFF; and
   a backup data transmitting section for transmitting, when the backup mode is ON, the user data selected by the data selecting section as backup data.

5. The mobile communication terminal claimed in claim 4, wherein the data selecting section regularly selects the user data from those stored in the mobile communication terminal according to the plurality of data selection conditions in accordance with the combined condition.

6. A mobile communication terminal comprising:
   a data selecting section for selecting user data as user backup data from the user data stored in the mobile communication terminal according to a combined condition and a data selection condition based on an amount of each user data, a data selection condition based on confidentiality of each user data, a data selection condition based on an arbitrary designation of a user data by the user of the mobile communication terminal, and a data selection condition based on a location of the mobile communication terminal, the selected user data matching the data selection condition in accordance with the combined condition;
   a backup mode switchable between ON and OFF; and
   a backup data transmitting section for transmitting, when the backup mode is ON, the user data selected by the data selecting section as backup data.

7. A backup device for storing backup data of user data stored in a mobile communication terminal, comprising:
   a data selection condition setting section for selecting a combined condition and at least one of a plurality of data selection condition candidates as a data selection condition, the data selection condition being used for selecting user backup data from the user data for backup, the selected user backup data matching at least one of the data selection conditions in accordance with the combined condition, the plurality of data selection conditions including a condition based on an arbitrary designation of the user data by the user of the mobile communication terminal; and
   a data selection condition informing section for informing the mobile communication terminal of the data selection conditions set by the data selection condition setting section,
   wherein the data selection condition candidates further include a condition based on an amount of each user data, a condition based on a type of each user data, a condition based on confidentiality of each user data, and a condition based on a location of the mobile communication terminal.

8. A data backup system for a mobile communication terminal, wherein:
   a backup device stores therein or in a recordable storage medium, backup data of user data stored in a mobile communication terminal through a communication network;
   the mobile communication terminal or the backup device includes a data selection condition setting section for selecting a combined condition and at least one of a plurality of data selection condition candidates as a data selection condition; and the mobile communication terminal includes:

a data selecting section for selecting, from the user data, the user backup data that satisfy the at least one of the plurality of data selection conditions set by the data selection condition setting section from the user data stored in the mobile communication terminal, the selected user backup data matching at least one of the selected data selection condition candidates in accordance with the combined condition, the at least one of the plurality of data selection conditions including a condition based on an arbitrary designation of a the user data by the user of the mobile communication terminal;

a backup mode switchable between ON and OFF; and a backup data transmitting section for transmitting, when the backup mode is ON, the user backup data selected by the data selecting section to the backup device.

9. The data backup system for the mobile communication terminal claimed in claim 8, wherein the data selection condition candidates further include at least one selected from a condition based on a type of each user data, a condition based on confidentiality of each user data, and a condition based on a location of the mobile communication terminal.

10. The data backup system for the mobile communication terminal claimed in claim 8, wherein the backup device includes:

a downloading section for downloading the backup data which the backup device stores therein or in the recordable storage medium to a communication terminal other than the mobile communication terminal through the communication network; and a media converting section for converting the backup data to a format compatible with the communication terminal.

11. The data backup system for the mobile communication terminal claimed in claim 8, wherein the backup device includes:

a downloading section for downloading the backup data which the backup device stores therein or in the recordable storage medium to a communication terminal other than the mobile communication terminal through the communication network; and an authenticating section for determining whether or not to allow the download.

12. A data backup system for a mobile communication terminal, wherein:

a backup device stores therein or in a recordable storage medium, backup data of user data stored in the mobile communication terminal through a communication network; and the mobile communication terminal includes:

a data selecting section for selecting the user backup data from the user data stored in the mobile communication terminal according to a plurality of data selection conditions and a combined condition, the selected user backup data matching at least one of the plurality of data selection conditions in accordance with the combined condition, the plurality of data selection conditions including a condition based on an arbitrary designation of the user data by the user of the mobile communication terminal;

a backup mode switchable between ON and OFF; and a backup data transmitting section for transmitting, when the backup mode is ON, the user backup data selected by the data selecting section to the backup device.

13. The data backup system for the mobile communication terminal claimed in claim 12, wherein the backup device includes:

a downloading section for downloading the backup data which the backup device stores therein or in the recordable storage medium to a communication terminal other than the mobile communication terminal through the communication network;

an authenticating section for determining whether or not to allow the download; and a login limiting section for limiting the number of logins or login time available for downloading the backup data by the downloading section.

14. A data backup method for a mobile communication terminal, in which a backup device stores therein or in a recordable storage medium, backup data of user data stored in the mobile communication terminal through a communication network, the method comprising the steps of:

selecting, by the mobile communication terminal or the backup device, a combined condition and at least one of a plurality of data selection condition candidates as a data selection condition, the plurality of data selection condition candidates including a condition based on an arbitrary designation of the user data by the user of the mobile communication terminal;

selecting, by the mobile communication terminal, the user backup data from the user data stored in the mobile communication terminal according to the plurality of data selection condition candidates, the selected user backup data matching at least one of the plurality of data selection condition candidates in accordance with the combined condition; and transmitting, by the mobile communication terminal, the selected user backup data to the backup device when a backup mode switchable between ON and OFF is ON.

15. The data backup method for the mobile communication terminal claimed in claim 14, wherein the data selection condition candidates further include at least one selected from a condition based on an amount of each user data, a condition based on a type of each user data, a condition based on confidentiality of each user data, and a condition based on a location of the mobile communication terminal.

16. A data backup method for a mobile communication terminal, in which a backup device stores therein or in a recordable storage medium, backup data of user data stored in the mobile communication terminal through a communication network, the method comprising the steps of:

selecting, by the mobile communication terminal, the user backup data from the user data stored in the mobile communication terminal according to a combined condition and a plurality of data selection condition candidates, the selected user backup data matching at least one of the plurality of data selection condition candidates in accordance with the combined condition, the plurality of data selection condition candidates including a condition based on an arbitrary designation of the user data by the user of the mobile communication terminal; and transmitting the selected user backup data from the mobile communication terminal to the backup device when a backup mode switchable between ON and OFF is ON.

17. A data backup method for a mobile communication terminal, in which a backup device stores therein or in a recordable storage medium, backup data of user data stored in a mobile communication terminal through a communication network, the method comprising the steps of:

selecting, by the mobile communication terminal, the user backup data from the user data stored in the mobile communication terminal according to a combined condition and a plurality of data selection conditions, the plurality of data selection conditions including a condition based on an arbitrary designation of the user data by the user of the mobile communication terminal;

dividing, by the mobile communication terminal, the user backup data into one or more blocks of information; and transmitting, when a backup mode switchable between ON and OFF is ON, the user backup data with respect to each information block to transmit user data stored in the mobile communication terminal to a backup server.

18. The data backup method for the mobile communication terminal claimed in claim 17, wherein the mobile communication terminal transmits only updated information blocks when transmitting the backup data with respect to each information block.

19. A backup data transmission method for a mobile communication terminal to transmit backup data of user data stored in the mobile communication terminal, the method comprising the steps of:

selecting a combined condition and at least one of a plurality of data selection condition candidates as a data selection condition, the plurality of data selection condition candidates including a condition based on an arbitrary designation of the user data by the user of the mobile communication terminal;

selecting, from the user data, user backup data that satisfy one or more of the data selection condition candidates in accordance with the combined condition from the user data stored in the mobile communication terminal; and transmitting the selected user backup data to a backup server when a backup mode switchable between ON and OFF is ON.

20. A backup data transmission method for a mobile communication terminal to transmit backup data of user data stored in the mobile communication terminal, the method comprising the steps of:

selecting the user backup data from the user data stored in the mobile communication terminal according to a combined condition and a plurality of data selection conditions, the selected user backup data matching at least one of the plurality of data selection conditions in accordance with the combined condition, the plurality of data selection conditions including a condition based on an arbitrary designation of the user data by the user of the mobile communication terminal; and transmitting the selected user backup data to a backup server when a backup mode switchable between ON and OFF is ON.

* * * * *